US010166835B2

United States Patent
Kim et al.

(10) Patent No.: US 10,166,835 B2
(45) Date of Patent: Jan. 1, 2019

(54) BATTERY COOLING SYSTEM FOR VEHICLE

(71) Applicant: Hyundai Motor Company, Seoul (KR)

(72) Inventors: Jae Yeon Kim, Whasung-Si (KR); Jai Young An, Whasung-Si (KR); Wan Je Cho, Whasung-Si (KR); Myunghwan Kim, Whasung-Si (KR); Minwook Kim, Whasung-Si (KR); Jeong Yeop Woo, Whasung-Si (KR); Yeon Ho Kim, Whasung-Si (KR); Yong Hyun Choi, Whasung-Si (KR); Gun Goo Lee, Whasung-Si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/498,798

(22) Filed: Apr. 27, 2017

(65) Prior Publication Data

US 2018/0111443 A1    Apr. 26, 2018

(30) Foreign Application Priority Data

Oct. 26, 2016  (KR) .................. 10-2016-0140184

(51) Int. Cl.
*B60H 1/00* (2006.01)
*B60H 1/32* (2006.01)

(52) U.S. Cl.
CPC ..... *B60H 1/00278* (2013.01); *B60H 1/00385* (2013.01); *B60H 1/00485* (2013.01); *B60H 1/323* (2013.01)

(58) Field of Classification Search
CPC ............... B60H 1/00278; B60H 1/323; B60H 1/00385; B60H 1/00485
See application file for complete search history.

(56) References Cited

U.S. PATENT DOCUMENTS 5,549,153 A * 8/1996 Baruschke ......... B60H 1/00278
165/42
6,357,541 B1   3/2002 Matsuda et al.
(Continued)

FOREIGN PATENT DOCUMENTS

| JP | 2002-352866 A | 12/2002 |
| JP | 2010-114063 A | 5/2010 |

(Continued)

OTHER PUBLICATIONS

Future Automotive Integrated Thermal Management Research Society Technical Seminar of The Korean Society of Automotive Engineers, Seoul National University, *Future Automotive Integrated Thermal Management Research Society*, Sep. 29, 2016.

*Primary Examiner* — Emmanuel Duke
(74) *Attorney, Agent, or Firm* — Morgan, Lewis & Bockius LLP

(57) ABSTRACT

A battery cooling system for a vehicle may include an air conditioning device including a compressor, a condenser, an evaporator, and a first expansion valve connected through a refrigerant line and circulating a refrigerant to cool the internal of the vehicle; a cooler including an electric device radiator and a first water pump connected with a cooling line and circulating coolant to cool a motor and an electric device; a battery module in which the coolant circulated therein through an operation of a second water pump provided on a battery cooling line, connected with the cooling line through the battery cooling line; and a chiller connected with the refrigerant line through a connection line, provided on the battery cooling line, and controlling a temperature of the coolant by heat-exchanging the coolant and the refrigerant selectively introduced thereinto.

16 Claims, 6 Drawing Sheets

(56) References Cited

U.S. PATENT DOCUMENTS

| | | | |
|---|---|---|---|
| 6,651,761 B1* | 11/2003 | Hrovat | H01M 8/04014 165/41 |
| 6,705,101 B2 | 3/2004 | Brotz et al. | |
| 7,147,071 B2* | 12/2006 | Gering | B60H 1/00278 237/12.3 B |
| 7,890,218 B2 | 2/2011 | Adams et al. | |
| 7,975,757 B2 | 7/2011 | Nemesh et al. | |
| 8,215,432 B2 | 7/2012 | Nemesh et al. | |
| 8,336,319 B2 | 12/2012 | Johnston et al. | |
| 8,402,776 B2 | 3/2013 | Johnston et al. | |
| 8,589,024 B2* | 11/2013 | Buford | B60L 11/1892 701/22 |
| 2002/0043413 A1* | 4/2002 | Kimishima | B60H 1/323 180/68.1 |
| 2009/0249807 A1* | 10/2009 | Nemesh | B60H 1/00278 62/117 |
| 2009/0280395 A1* | 11/2009 | Nemesh | B60H 1/00278 429/62 |
| 2009/0317697 A1* | 12/2009 | Dogariu | B60H 1/00278 429/62 |
| 2011/0296855 A1* | 12/2011 | Johnston | B60L 3/0046 62/79 |
| 2012/0234518 A1* | 9/2012 | Brodie | B60H 1/00278 165/104.31 |
| 2012/0297805 A1* | 11/2012 | Kamada | B60H 1/00278 62/208 |
| 2013/0074525 A1 | 3/2013 | Johnston et al. | |
| 2013/0118707 A1* | 5/2013 | Kardos | B60H 1/00278 165/42 |
| 2014/0033761 A1 | 2/2014 | Kawakami et al. | |
| 2014/0060102 A1 | 3/2014 | Nemesh et al. | |
| 2014/0216689 A1 | 8/2014 | Lombardo et al. | |
| 2014/0216693 A1* | 8/2014 | Pekarsky | B60H 1/00278 165/104.31 |
| 2015/0128632 A1* | 5/2015 | Kishita | B60L 11/1875 62/324.6 |
| 2015/0291008 A1* | 10/2015 | Seto | B60L 1/003 62/208 |

FOREIGN PATENT DOCUMENTS

| | | |
|---|---|---|
| JP | 5336033 B2 | 11/2013 |
| JP | 2015-186989 A | 10/2015 |
| KR | 20-1987-0004009 U | 3/1987 |
| KR | 10-2014-0066806 A | 6/2014 |
| WO | WO 2012/013583 A1 | 2/2012 |

* cited by examiner

BATTERY COOLING SYSTEM FOR VEHICLE

CROSS-REFERENCE(S) TO RELATED APPLICATIONS

The present application claims priority to Korean Patent Application No. 10-2016-0140184 filed on Oct. 26, 2016, the entire contents of which are incorporated herein for al purposes by this reference.

BACKGROUND OF THE INVENTION

Field of the Invention

The present invention relates to a battery cooling system for a vehicle. More particularly, the present invention relates to a battery cooling system for a vehicle, which interlocks an air conditioning device and cooling device that circulates coolant in a motor and an electric device in an electric vehicle or a hybrid vehicle and increases the temperature or cools down a battery module according to a state of the vehicle using the coolant circulating the cooling means.

Description of Related Art

In general, an air conditioning system for a vehicle includes an air conditioning system that circulates a refrigerant to warm up or cool down the interior of the vehicle.

Such an air conditioning device can maintain a comfortable indoor environment of the vehicle by maintaining a vehicle interior temperature at an appropriate temperature regardless of a temperature change of the exterior, and the refrigerant discharged by the driving of a compressor circulates back to the compressor through a condenser, a receiver dryer, an expansion valve, and an evaporator and heat exchange occurs during the circulation wherein the interior of the vehicle is warmed up or cooled down.

That is, in a summer cooling mode, a high-temperature and high-pressure gaseous refrigerant compressed by the compressor is condensed through the condenser and then evaporated through the receiver dryer and the expansion valve such that the indoor temperature and humidity of the vehicle can be lowered.

Recently, there is a need of developing an environmentally-friendly vehicle that can substantially replace the Internal Combustion Engine (ICE) vehicles, with an increasing concern on energy efficiency and the problem with environmental pollution and the environmentally-friendly vehicle generally falls into an electric vehicle driven by a fuel cell or electricity, which is the power source, and a hybrid vehicle driven by an engine and an electric battery.

In the electric vehicle, among the environmentally-friendly vehicles, a separate heater is not used unlike an air conditioner of a general vehicle, and an air conditioner, which is applied to the electric vehicle, is typically referred to as a heat pump system.

In the case of the electric vehicle, chemical reaction energy of oxygen and hydrogen is converted into electric energy to generate a driving force, and during this process, heat energy is generated by chemical reaction in the fuel cell, and as a result, effectively removing the generated heat is required to secure performance of the fuel cell.

Even in the hybrid vehicle, the driving force is generated by driving the motor by using electricity supplied from the fuel cell or the electric battery together with the engine that is actuated with general fuel, and as a result, the performance of the motor can be secured only by effectively removing the heat generated from the fuel cell or the battery, and the motor.

Accordingly, in a hybrid vehicle or an electric vehicle according to conventional art needs to be provided with an electric device cooling means, a heat pump system, and a battery cooling system, respectively formed as closed circuits, to prevent the overheating of a battery including a motor, an electric device, and a fuel cell.

Thus, the size and weight of a cooling module provided in the front side of the vehicle are increased, and a layout of connection pipe through which a refrigerant or cooling water is supplied to the heat pump system, the electric unit cooling means, and the battery cooling system respectively in an engine compartment becomes complicated.

Further, since the battery cooling system that warms up or cools down the battery according to a state of the vehicle for optimal performance of the battery is separately provided, a plurality of valves are required to connect the battery cooling system to the respective connection pipes and the noise and vibration generated from frequent closing and opening of the valves are transferred to the interior of the vehicle, thereby deteriorating riding comfort.

The information disclosed in this Background section is only for enhancement of understanding of the background of the invention and should not be taken as an acknowledgement or any form of suggestion that this information forms the prior art already known to a person skilled in the art.

BRIEF SUMMARY

Various aspects of the present invention are directed to providing a battery cooling system for a vehicle, which can selectively use a refrigerant and cooling water that circulate an air conditioning device and a cooler in an electric vehicle or a hybrid vehicle to increase the temperature or cool down a battery module in a water-cooling manner to increase the total travel distance of the vehicle through effective battery management.

A battery cooling system for a vehicle according to an exemplary embodiment of the present invention may include an air conditioning device including a compressor, a condenser, an evaporator, and a first expansion valve connected through a refrigerant line and circulating a refrigerant to cool the internal of the vehicle; a cooler including an electric device radiator and a first water pump connected with a cooling line and circulating coolant to cool a motor and an electric device; a battery module in which the coolant circulated therein through an operation of a second water pump provided on a battery cooling line, connected with the cooling line through the battery cooling line; and a chiller connected with the refrigerant line through a connection line, disposed on the battery cooling line, and controlling a temperature of the coolant by heat exchange between the coolant and the refrigerant selectively introduced thereinto.

The connection line may be provided with a second expansion valve between the condenser and the chiller.

The second expansion valve may operate to cool the battery module using the refrigerant, and expands the refrigerant introduced through the connection line and introduces the expanded refrigerant to the chiller.

A first valve, which selectively connects the cooling line and the battery cooling line, may be disposed on the battery cooling line between the radiator and the chiller, and a second valve, which selectively connects the cooling line and the battery cooling line, may be disposed on the cooling line between the radiator and the battery module.

The battery cooling line may include a first branch line to connect the chiller with the battery module through the first valve.

The first valve may connect the cooling line connected with the radiator and the battery cooling line, and may close the first branch line when cooling the battery module using the coolant cooled from the radiator.

The first valve may open the first branch line, and may close connection of the cooling line with the battery cooling line when increasing a temperature of the battery module or cooling the battery module using the coolant heat-exchanged with the refrigerant.

The cooling line may include a second branch line to connect the radiator with the motor and the electric device through the operation of the second valve between the electric device and the chiller.

The second valve may close the second branch line when cooling down the battery module using the coolant cooled from the radiator.

The second valve may close connection of the battery cooling line with the cooling line, and may open the second branch line, when cooling down only the motor and the electric device using the coolant.

The second valve may open the second branch line, and may close connection of the cooling line with the battery cooling line, when the coolant heat-exchanged with the refrigerant cools the battery module or warms-up the battery module and increases a temperature of the battery module.

The first valve and the second valve may be three-way valves.

A reservoir tank may be disposed on the cooling line between the radiator and the second valve.

The reservoir tank may be connected with the first branch line through a degassing line.

The degassing line may exhaust bubbles generated from the coolant passed through the first branch line to the reservoir tank or may introduce bubbles collected from the coolant circulated through the cooling line to the first branch line to maintain pressure balancing of the cooling line and the battery cooling line, when the temperature of the battery module increases.

The degassing line may partially introduce the bubbles included in the coolant passed through the first branch line to the reservoir tank to prevent pressure difference generation between the cooling line and the first branch line when the coolant heat-exchanged with the refrigerant cools the battery module in a state that the coolant is not circulated to the cooling line.

The motor and the electric device may be serially disposed on the cooling line between the radiator and the first water pump.

The electric device may include: an electric power control unit (EPCU) disposed on the cooling line between the motor and the first water pump; and an on-board charger (OBC) disposed on the cooling line between the motor and the radiator.

A heater may be disposed between the battery module and the chiller in the battery cooling line, and the heater may be operated when increasing the temperature of the battery module to heat cooling water circulating through the battery cooling line and to introduce the heated cooling water into the battery module.

As described above, the battery cooling system for the vehicle according to an exemplary embodiment of the present invention can selectively use a refrigerant and coolant circulating an air conditioning device and a cooler in an electric vehicle or a hybrid vehicle to increase a temperature or cool down a battery module in a water-cooling manner so that the system can be simplified, and the total travel distance of the vehicle can be increased through effective battery management.

Further, through simplification of the entire system, manufacturing cost and weight can be reduced and spatial utilization can be improved.

In addition, the number of valves for inter-working of the air conditioning device and the cooler to reduce cost, and noise and vibration due to frequent valve opening and closng operations can be reduced to improve riding comfort of the vehicle.

Furthermore, the battery module, the motor, and the electric device are serially connected, and the flow rate of the coolant which is flowed at the cooling line and battery cooling line may be increased through two water pumps. Therefore, the overall cooling performance is improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
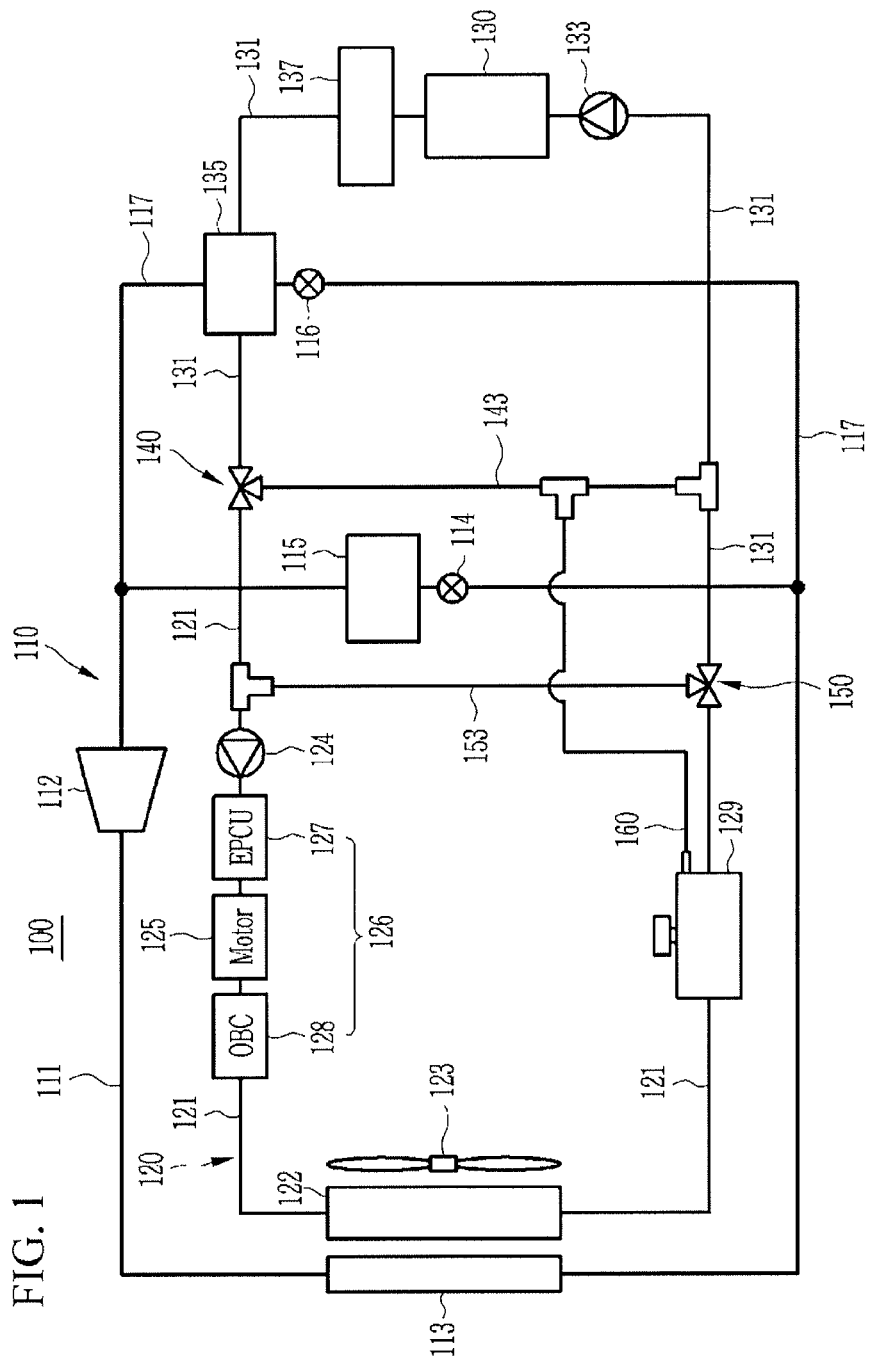
FIG. 1 is a block diagram of a battery cooling system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompany drawing and described below.

While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Further, unless explicitly described to the contrary, the word "comprise" and variations such as "comprises" or "comprising", will be understood to imply the inclusion of stated elements but not the exclusion of any other elements.

The size and thickness of each component illustrated in the drawings are arbitrarily shown for better understanding and ease of description, but the present invention is not limited thereto. Thicknesses are enlarged to clearly express various portions and areas.

In addition, "device", "means", "part", "member", or the like, which is described in the specification, means a device of a comprehensive configuration that performs at least one function or operation.

FIG. 1 is a block diagram of a battery cooling system for a vehicle according to an exemplary embodiment of the present invention.

Referring to FIG. 1, a battery cooling system 100 for a vehicle according to an exemplary embodiment of the present invention is applicable to a hybrid vehicle or an electric vehicle which also uses an engine and a motor together.

Such a battery cooling system 100 interacts with an air conditioning device 110, which is an air conditioner for cooling down or warming up the internal of the vehicle, and a cooler 120 cooling down a motor 125 and an electric device 126.

In the present exemplary embodiment, the air conditioning device 110 includes a compressor 112, a condenser 113, an evaporator 115, and a first expansion valve 114 that are connected with each other through a refrigerant line 111.

Such an air conditioning device 110 cools down the internal of the vehicle through circulation of a refrigerant during a vehicle cooling mode.

The cooler 120 includes a radiator 122 and a first water pump 124 connected through the cooling line 121, and circulates coolant to cool the motor 125 and the electric device 126.

Here, the electric device 126 may include an electric power control unit (EPCU) 127 provided on the cooling line 121 between the motor 125 and the first water pump 124 and an on-board charger (OBC) 128 provided on the cooling line 121 between the motor 125 and the electric device radiator 122.

The radiator 122 is disposed in a front side of the vehicle, and a cooling fan 123 is disposed in a rear side of the vehicle wherein coolant is cooled by operation with the cooling fan 123 and heat exchange with the outside air.

Here, the motor 125 and the electric device 126 may be disposed in series on cooling line 121 between the radiator 122 and the first water pump 124.

The cooler 120 configured as above circulates the coolant cooled in the radiator 122 through the cooling line 121 by operation of the first water pump 124 to cool down the motor 125 and the electric device 126.

Here, the battery cooling system 100 according to an exemplary embodiment of the present invention may include a battery module 130 and a chiller 135.

The battery module 130 supplies power to the motor 125 and the electric device 126. The battery module 130 is connected with the cooler 120 through a battery cooling line 131, and the coolant may be circulated in the battery module 130 through the operation of the second water pump 133 provided on the battery cooling line 131.

Here, the first water pump 124 and the second water pump 133 may be electrical water pumps.

That is, the battery module 130 may be a water-cooled type and thus is cooled by coolant.

The chiller 135 is connected with the refrigerant line 111 of the air conditioning device 110 through a connection line 117, disposed on the battery cooling line 131, and is configured to control the temperature of the coolant by heat exchange between the coolant and the refrigerant flowing therein.

Here, in the connection line 117, a second expansion valve 116 may be disposed between the condenser 113 and the chiller 135.

The second expansion valve 116 operates when the battery module 130 is cooled using the refrigerant. Such a second expansion valve 116 expands the refrigerant introduced through the connection line 117 to introduce the refrigerant in a lower temperature state to the chiller 135.

That is, the second expansion valve 116 expands the condensed refrigerant discharged from the condenser 113 to lower the temperature of the refrigerant and introduces the low-temperature refrigerant to the chiller 135 wherein the temperature of the coolant passing through the chiller 135 can be further decreased. Accordingly, the coolant, of which the temperature is decreased while passing through the chiller 135, is introduced into the battery module 130 wherein the battery module 130 can be more efficiently cooled down.

The heater 137 may be provided on the battery cooling line 131 between the battery module 130 and the chiller 135.

When temperature increase of the battery module 130 is required, the heater 137 is switched on to heat the coolant circulated along the battery cooling lines 131 making it possible to introduce the coolant of which a temperature is raised into the battery module 130.

In the present exemplary embodiment, a first valve 140, which selectively connects the cooling line 121 and the battery cooling line 131, is disposed on the battery cooling line 131 between the radiator 122 and the chiller 135.

The battery cooling line 131 may include a first branch line 143 to connect respective the battery cooling lines 131 with each other between the chiller 135 and the battery module 130 through the first valve 140.

Here, when the battery module 130 is cooled using the coolant cooled from the radiator 122, the first valve 140 may connect the battery cooling line 131 with the cooling line 121 connected with the radiator 122, and may close the first branch line 143.

Further, when increasing a temperature of the battery module 130 or cooling the battery module 130 using the coolant heat-exchanged with the refrigerant, the first valve 140 may open the first branch line 143, and may close connection of the cooling line 121 with the battery cooling line 131.

That is, the coolant at a low temperature heat-exchanged with the refrigerant in the chiller 135 may be introduced into the battery module 130 through the first branch line 143 which is opened by the first valve 140 to efficiently cool the battery module 130.

Meanwhile, by preventing the coolant circulated through the battery cooling line 131 from being introduced into the radiator 122 by an operation of the first valve 140 when a temperature of the battery module 130 is increased, the coolant heated through an operation of the heater 137 may be introduced into the battery module 130 to rapidly increase a temperature of the battery module 130.

In the present exemplary embodiment, a second valve 150, which selectively connects the cooling line 121 and the battery cooling line 131, is disposed on the cooling line 121 between the radiator 122 and the battery module 130.

In addition, the cooling line 121 may include a second branch line 153 to connect the radiator 122 with the motor 125 and the electric device 126 through an operation of the second valve 150 between the electric device 126 and the chiller 135.

In the present case, the second valve 150 may close the second branch line 153 when cooling down the battery module 130 using the coolant cooled from the radiator 122.

Accordingly, the coolant cooled from the radiator 122 flows through the battery cooling line 131 connected with the cooling line 121 by an operation of the second valve 150 to cool the battery module 130.

Meanwhile, the second valve 150 may close connection of the battery cooling line 131 with the cooling line 121, and may open the second branch line 153 when cooling down only the motor 125 and the electric device 126 using the coolant.

That is, the coolant cooled from the radiator 122 is introduced into the motor 125 and the electric device 126 through the second branch line 153 to rapidly cool the motor 125 and the electric device 126.

Further, when the coolant heat-exchanged with the refrigerant cools the battery module 130 or warms-up the battery module 130 and increases a temperature of the battery module 130, the second valve 150 may open the second branch line 153, and may close connection of the cooling line 121 with the battery cooling line 131.

In the present exemplary embodiment, the first valve 140 and the second valve 150 may include a three-way valve.

Meanwhile, the cooling line 121 may be disposed with a reservoir tank 129 between the radiator 122 and the second valve 150.

The reservoir tank 129 may store cooled coolant introduced from the radiator 122.

Further, the reservoir tank 129 may be connected with the first branch line 143 through a degassing line 160.

When the temperature of the battery module 130 increases, the degassing line 160 may exhaust bubbles generated from the coolant passed through the first branch line 143 to the reservoir tank 129 or may introduce bubbles collected from the coolant circulated through the cooling line 121 to the first branch line 143 to maintain pressure balancing of the cooling line 121 and the battery cooling line 131.

Further, when the coolant heat-exchanged with the refrigerant cools the battery module 130 in a state that the coolant is not circulated to the cooling line 121, the degassing line 160 may partially introduce the bubbles included in the coolant passed through the first branch line 143 to the reservoir tank 129 to prevent pressure difference generation between the cooling line 121 and the first branch line 143.

Meanwhile, in the present exemplary embodiment, the reservoir tank 129 is disposed between the radiator 122 and the battery module 130 at the cooling line 121. An exemplary embodiment has described that the degassing line 160 is connected with the first branch line 143. However, the present invention is limited thereto. The reservoir tank 129 may be disposed between the radiator 122 and the battery module 130 at the battery cooling line 131. In the present case, the degassing line 160 may be connected with the second branch line 153.

Hereinafter, an operation by modes of the pump system 100 for the vehicle configured as above according to an exemplary embodiment of the present invention in cooling down and increases a temperature of the battery module 130 will be described in detail.

Figure 2:
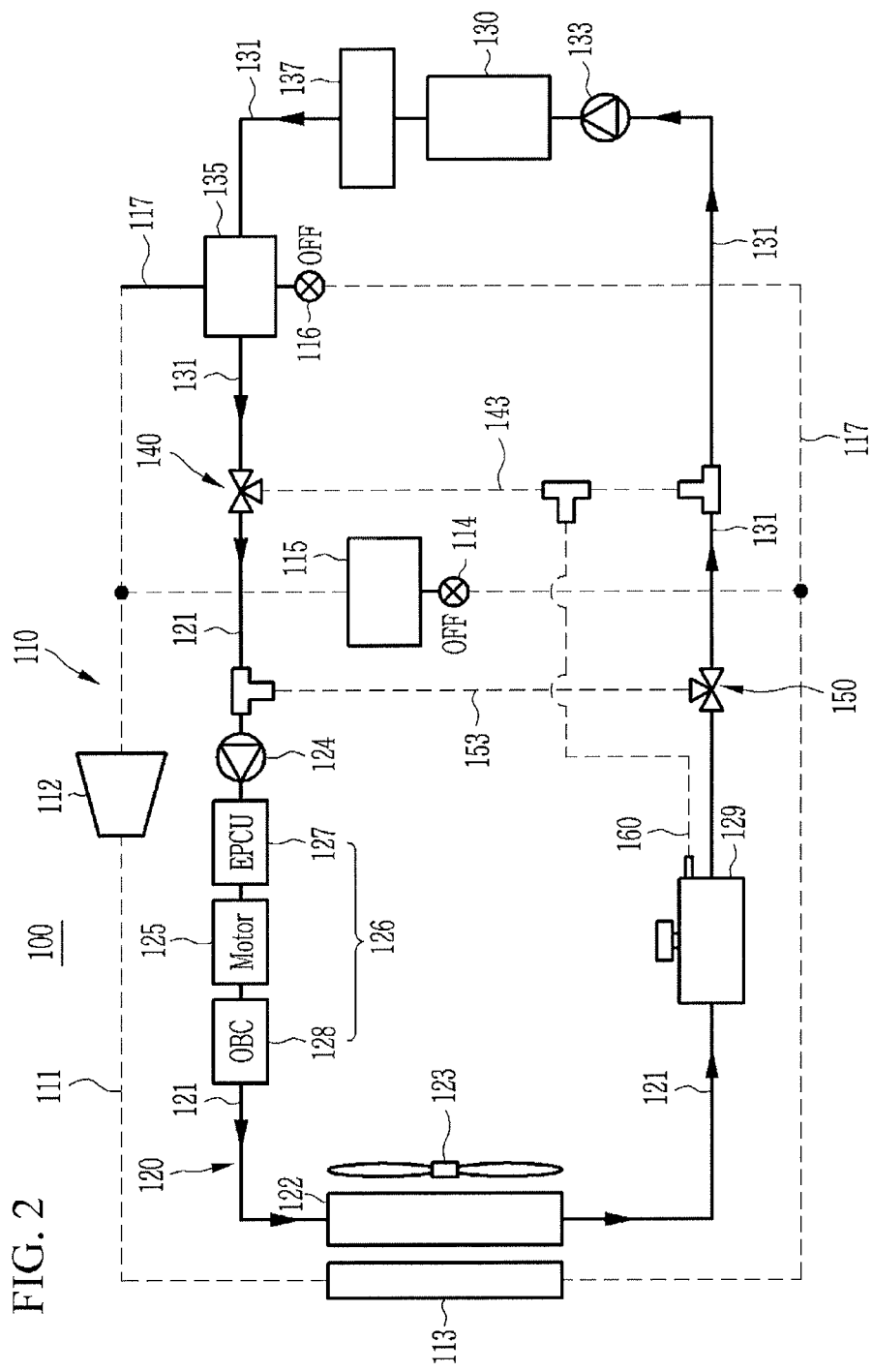
FIG. 2 is an operational state view illustrating cooling of the battery module using a coolant in the battery cooling system for the vehicle according to an exemplary embodiment of the present invention.

FIG. 2 is an operational state view illustrating cooling of the battery module using a coolant in the battery cooling system for the vehicle according to an exemplary embodiment of the present invention.

Referring to FIG. 2, the cooler 120 is operated to cool the motor 125 and the electric device 126.

In the present case, the first valve 140 connects the battery cooling line 131 with the cooling line 121 connected with the radiator 122, and closes the first branch line 143.

The second valve 150 closes the second branch line 153 while connecting the cooling line 121 and the battery cooling line 131.

Accordingly, the battery cooling line 131 may be connected with the cooling line 121 of the cooler 120 by operations of the first and second valves 140 and 150 to form one closed circuit in which the coolant is circulated.

Then, the coolant cooled in the radiator 122 circulates through the cooling line 121 and the battery cooling line 131 to sequentially cool the battery module 130, the motor 125, and the electric device 125 by operations of the first and second water pumps 124 and 133.

Accordingly, the coolant cooled in the radiator 122 flows in the battery cooling line 131 and then passes through the battery module 130. Next, the coolant passes through the heater 137, which is turned-off, and then flows in the motor 125 and the electric device 126 through the cooling line 121.

That is, the coolant at a low temperature cooled from the radiator 122 firstly cools the battery module 130. to efficiently cool the battery module 130.

Figure 3:
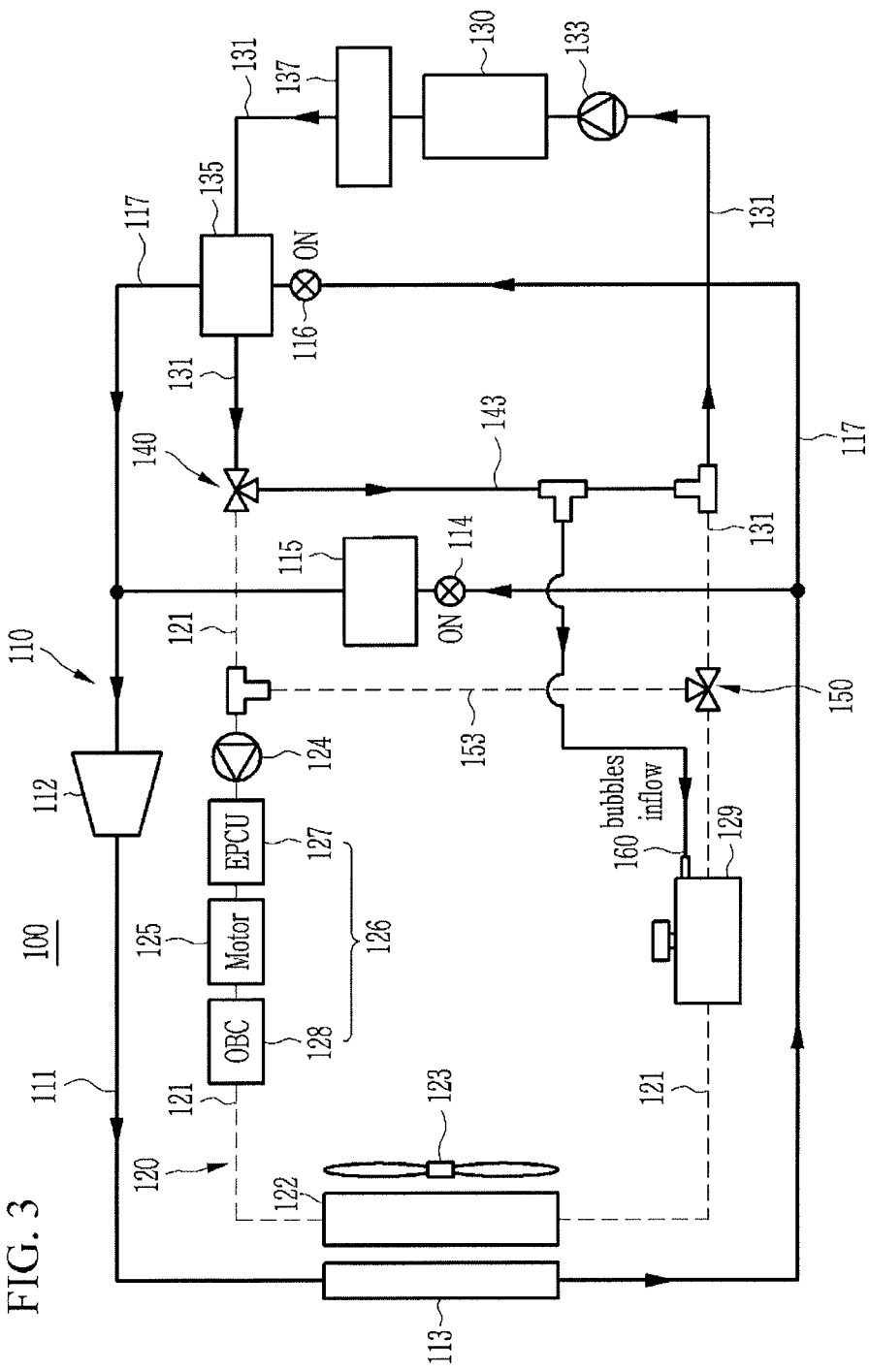
FIG. 3 is an operational state view illustrating cooling of a battery module during a vehicle cooling mode in the battery cooling system for the vehicle according to an exemplary embodiment of the present invention.

FIG. 3 is an operational state view illustrating cooling of a battery module during a vehicle cooling mode in the battery cooling system for the vehicle according to an exemplary embodiment of the present invention.

Referring to FIG. 3, when the battery module 130 is cooled down during the vehicle cooling mode, the air conditioning device 110 operates wherein the refrigerant circulates along the refrigerant line 111 and the internal of the vehicle is cooled down.

In the present case, the refrigerant is introduced to the condenser 113 from the compressor 112 and passed through the first expansion valve 114 along the refrigerant line 111 while being condensed through heat-exchange with the outside air.

The refrigerant expanded while passing through the first expansion valve 114 is evaporated through the evaporator 115, and then supplied again to the compressor 112 and circulates the air conditioning device 110.

Here, the second expansion valve 116 is opened, and partially expands the refrigerant discharged from the condenser 113 and supplies the expanded refrigerant to the chiller 135.

Further, the first valve 140 opens the first branch line 143, and may close connection of the battery cooling line 131 with the cooling line 121.

The second valve 150 closes the second branch line 153, and may close connection of the battery cooling line 131 with the cooling line 121.

Here, when the coolant heat-exchanged with the refrigerant cools the battery module 130 in a state that the coolant is not circulated to the cooling line 121, the degassing line 160 partially introduces the bubbles included in the coolant passed through the first branch line 143 to the reservoir tank 129 to prevent pressure difference generation between the cooling line 121 and the first branch line 143.

Accordingly, the coolant cooled from heat-exchange with the refrigerant in the chiller 135 is introduced into the battery module 130 by operation of the second water pump 133.

That is, the coolant at a low temperature heat-exchanged with the refrigerant in the chiller 135 may be introduced into the battery module 130 through the first branch line 143 which is opened by the first valve 140 to efficiently cool the battery module 130.

Figure 4:
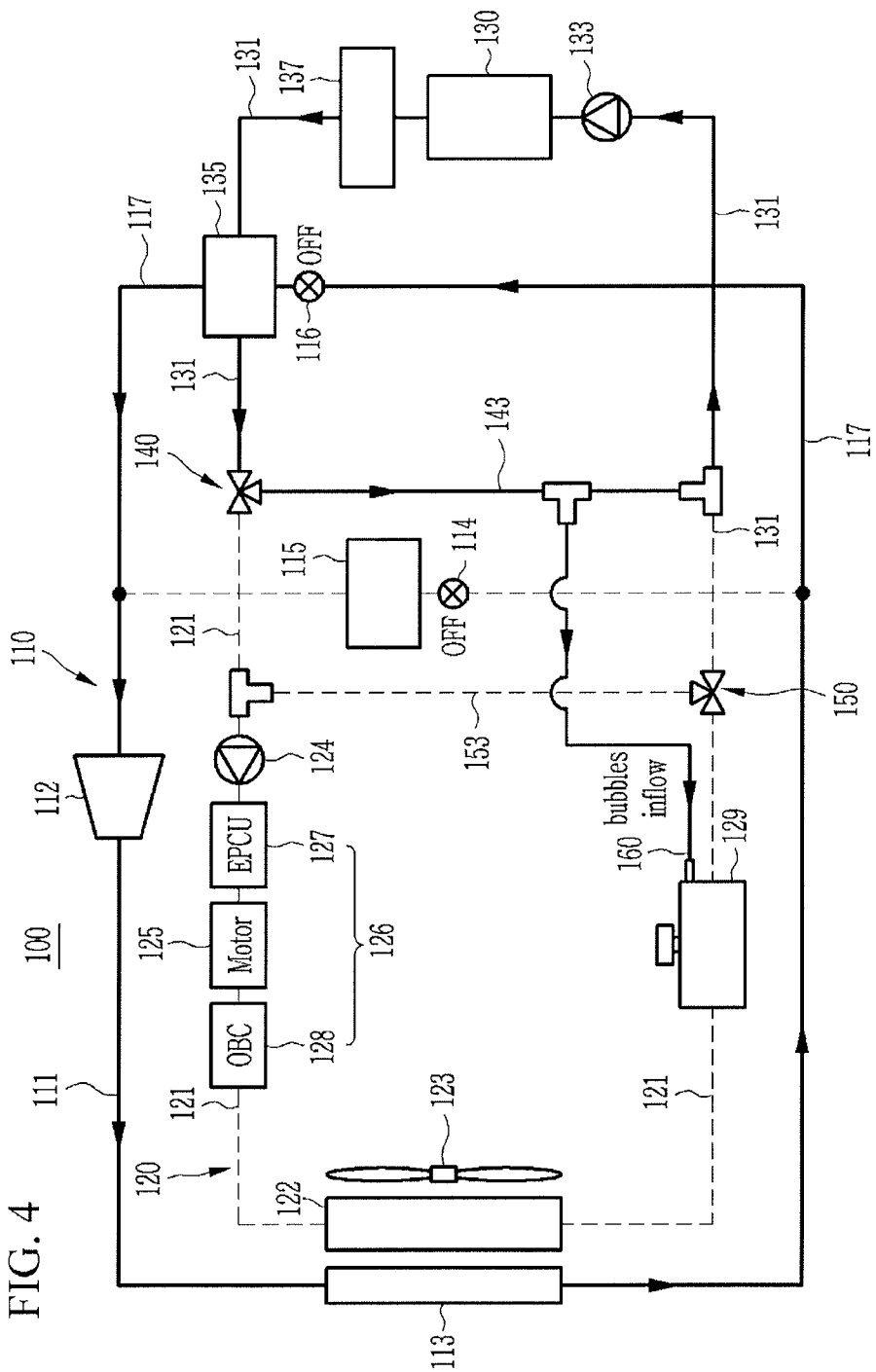
FIG. 4 is an operational state view illustrating cooling of the battery module using a refrigerant in the battery cooling system for the vehicle according to an exemplary embodiment of the present invention.

FIG. 4 is an operational state view illustrating cooling of the battery module using a refrigerant in the battery cooling system for the vehicle according to the exemplary embodiment of the present invention.

Referring to FIG. 4, when the battery module 130 is cooled using the refrigerant, operation of the first expansion valve 114 of the air conditioning device 110 is stopped wherein no more refrigerant is introduced into the evaporator 115.

In such a state, the refrigerant is introduced into the condenser 113 from the compressor 112 and condensed through heat-exchange with the outside air. After that, the refrigerant is discharged from the condenser 113 and expanded while passing through the second expansion valve 116 along the refrigerant line 111, and then passed through the chiller 135 and supplied back to the compressor 112.

Here, the first valve 140 opens the first branch line 143, and may close connection of the cooling line 121 with the battery cooling line 131.

The second valve 150 closes the second branch line 153, and may close connection of the cooling line 121 with the battery cooling line 131.

Meanwhile, when the coolant heat-exchanged with the refrigerant cools the battery module 130 in a state that the coolant is not circulated to the cooling line 121, the degassing line 160 partially introduces the bubbles included in the coolant passed through the first branch line 143 to the reservoir tank 129 to prevent pressure difference generation between the cooling line 121 and the first branch line 143.

Accordingly, the coolant cooled through heat-exchange with the refrigerant in the chiller 135 is introduced into the battery module 130 by operation of the second water pump 133.

That is, the coolant at a low temperature heat-exchanged with the refrigerant in the chiller 135 may be introduced into the battery module 130 through the first branch line 143 which is opened by the first valve 140 to efficiently cool the battery module 130.

Meanwhile, in FIG. 3 and FIG. 4, the cooler 120 does not operate in the exemplary embodiment of the present invention, but the present invention is not limited thereto, and the coolant may be circulated through the cooling line 121 when the motor 125 and the electric device 126 need to be cooled.

That is, When the cooling line 121 and the battery cooling line 131 form an independent circuits, the degassing line 160 may exhaust bubbles generated from the coolant passed through the first branch line 143 to the reservoir tank 129 or may introduce bubbles collected from the coolant circulated through the cooling line 121 to the first branch line 143 to maintain pressure balancing of the cooling line 121 and the battery cooling line 131.

Figure 5:
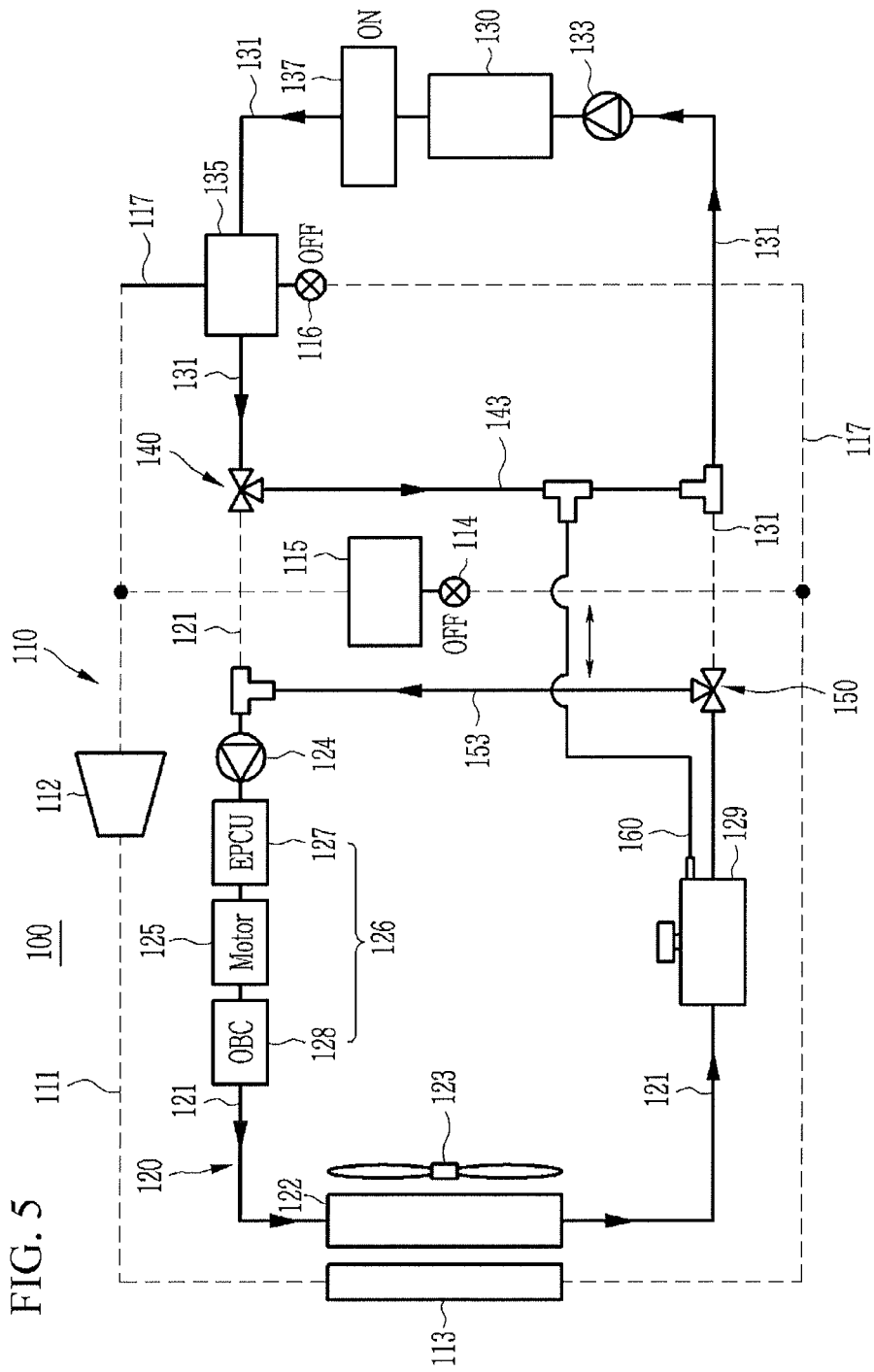
FIG. 5 is an operational state view illustrating increasing the temperature of the battery module during cooling of a motor and an electric device in the battery cooling system for the vehicle according to an exemplary embodiment of the present invention.

FIG. 5 is an operational state view illustrating increasing the temperature of the battery module during cooling of a motor and an electric device in the battery cooling system for the vehicle according to an exemplary embodiment of the present invention.

Referring to FIG. 5, the electric device cooler 120 operates to cool the motor 125 and the electric device 126.

In the present case, the first valve 140 opens the first branch line 143, and closes connection of the cooling line 121 with the battery cooling line 131.

Then, the second valve 150 closes connection of the cooling line 121 with the battery cooling line 131, and opens the second branch line 153.

Accordingly, the cooling line 121 and the battery cooling line 131 may form a closed circuit with the first and second branch lines 143 and 153 respectively in which the coolant is independently circulated.

That is, the coolant cooled in the radiator 122 circulates the cooling line 121 to cool the motor 125 and the electric device 126 by operation of the first water pump 124.

The coolant of the battery cooling line 131 circulates the battery cooling line 131 by operation of the second water pump 133.

Here, the degassing line 160 may exhaust bubbles generated from the coolant passed through the first branch line 143 to the reservoir tank 129 or may introduce bubbles collected from the coolant circulated through the cooling line 121 to the first branch line 143 to maintain pressure balancing of the cooling line 121 and the battery cooling line 131.

Meanwhile, the heater 137 is operated to introduce coolant having increased temperature into the battery module 130 by heating the coolant circulated from the battery cooling line 131.

Accordingly, the coolant, which circulates through the cooling line 121 by operation of the first valve 140, is not flowed into the radiator 122 and independently circulates a closed circuit.

Simultaneously, the coolant, which circulates through the battery cooling line 131, flows into the battery module 130 in a state in which it is heated by operation of the heater 137 more rapidly increasing the temperature of the battery module 130.

Figure 6:
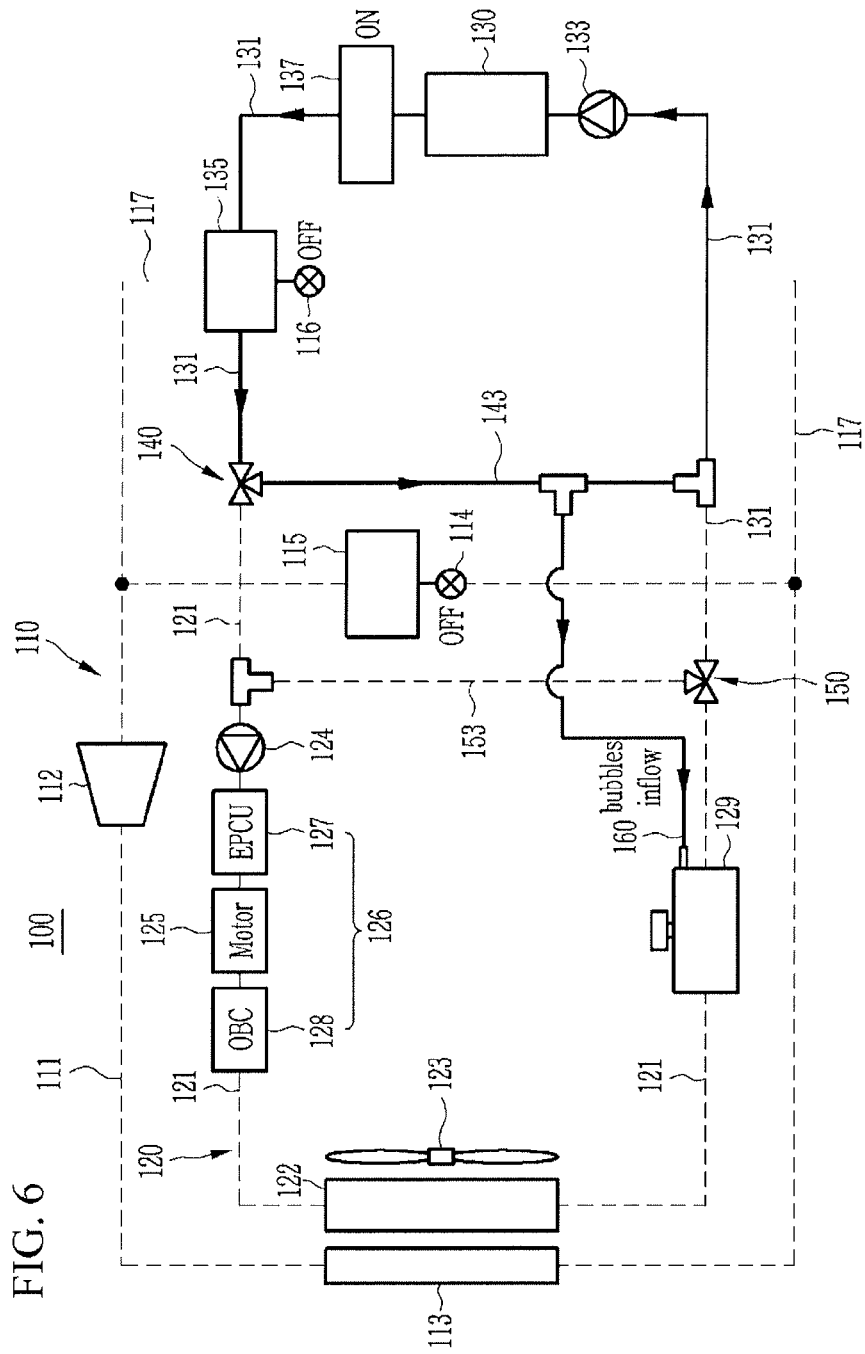
FIG. 6 is an operational state view illustrating increasing the temperature of the battery module while cooling of the motor and the electric device are stopped in the battery cooling system for the vehicle according to an exemplary embodiment of the present invention.

FIG. 6 is an operational state view illustrating increasing the temperature of the battery module while cooling of the motor and the electric device are stopped in the battery cooling system for the vehicle according to an exemplary embodiment of the present invention.

Referring to FIG. 6, when the motor 125 and the electric device 126 do not need to be cooled, the first valve 140 opens the first branch line 143 and may close connection of the cooling line 121 with the battery cooling line 131.

The second valve 150 closes the second branch line 153 and may close connection of the cooling line 121 with the battery cooling line 131.

Accordingly, the battery cooling line 131 may form a closed circuit with the first branch line 143 in which the coolant is independently circulated.

Thus, the coolant of the battery cooling line 131 iteratively circulates the battery cooling line 131 connected with the first branch line 143 by operation of the second water pump 133.

Here, when increasing the temperature of the battery module 130 in a state that the coolant is not circulated to the cooling line 121, the degassing line 160 partially introduces the bubbles included in the coolant passed through the first branch line 143 to the reservoir tank 129 to prevent pressure difference generation between the cooling line 121 and the first branch line 143.

Meanwhile, the heater 137 is switched on to heat the coolant circulating the battery cooling line 131. The coolant having the increased temperature passed through the heater 137 circulates along the battery cooling line 131 and the first branch line 143 and flows into the battery module 130.

That is, the coolant, which circulates through the cooling line 121 by operation of the first valve 140, does not flow into the radiator 122 and independently circulates a closed circuit.

Accordingly, the coolant in which circulates the battery cooling line 131 flows into the battery module 130 in a state to be heated by operation of the heater 137. That is, the battery module 130 can be quickly warmed up by introduction of the heated coolant.

Thus, the battery cooling system 100 configured as above according to an exemplary embodiment of the present invention can selectively use a refrigerant and coolant circulating the air conditioning device 110 and the cooler 120 in the electric vehicle or a hybrid vehicle to increase a temperature or cool down the battery module 130 in a water-cooling manner so that the system can be simplified, and the total travel distance of the vehicle can be increased through effective battery management.

In addition, the entire system can be simplified so that manufacturing cost and the weight can be reduced, and spatial utilization can be improved.

Further, the number of valves for inter-working of the air conditioning device 110 and the cooler 120 can be reduced to reduce cost, and noise and vibration due to frequent valve opening and closing operations to improve riding comfort of the vehicle.

Furthermore, the battery module 130, the motor 125, and the electric device 126 are serially connected, and flow rate of the coolant which flows in the cooling line 121 and battery cooling line 131 may be increased through the first and second two water pumps 124 and 133. Therefore, the overall cooling performance is improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery cooling system for a vehicle, comprising:
    an air conditioning device including a compressor, a condenser, an evaporator, and a first expansion valve connected through a refrigerant line and circulating a refrigerant;
    a cooler including an electric device radiator and a first water pump connected with a cooling line and circulating coolant to cool a motor and an electric device;
    a battery module in which the coolant circulated therein through an operation of a second water pump provided on a battery cooling line, connected with the cooling line through the battery cooling line; and
    a chiller connected with the refrigerant line through a connection line, provided on the battery cooling line, and controlling a temperature of the coolant by heat-exchanging the coolant and the refrigerant selectively introduced thereinto,
    wherein a first valve, which selectively connects the cooling line and the battery cooling line, is provided on the battery cooling line between the radiator and the chiller, and a second valve, which selectively connects the cooling line and the battery cooling line, is provided on the cooling line between the radiator and the battery module,
    wherein a reservoir tank is provided on the cooling line between the radiator and the second valve, and
    wherein the reservoir tank is connected with the first branch line through a degassing line.

2. The battery cooling system for the vehicle of claim 1, wherein the connection line is provided with a second expansion valve between the condenser and the chiller.

3. The battery cooling system for the vehicle of claim 2, wherein the second expansion valve is configured to operate when to cool the battery module using the refrigerant, and expands the refrigerant introduced through the connection line and introduces the expanded refrigerant to the chiller.

4. The battery cooling system for the vehicle of claim 1, wherein the battery cooling line includes a first branch line to connect the chiller with the battery module through the first valve.

5. The battery cooling system for the vehicle of claim 4, wherein the first valve connects the cooling line connected with the radiator and the battery cooling line, and closes the first branch line when cooling the battery module using the coolant cooled from the radiator.

6. The battery cooling system for the vehicle of claim 4, wherein the first valve opens the first branch line, and closes connection of the cooling line with the battery cooling line when increasing a temperature of the battery module or cooling the battery module using the coolant heat-exchanged with the refrigerant.

7. The battery cooling system for the vehicle of claim 1, wherein the cooling line includes a second branch line to connect the radiator with the motor and the electric device through an operation of the second valve between the electric device and the chiller.

8. The battery cooling system for the vehicle of claim 7, wherein the second valve closes the second branch line when cooling down the battery module using the coolant cooled from the radiator.

9. The battery cooling system for the vehicle of claim 7, wherein the second valve closes connection of the battery cooling line with the cooling line, and opens the second branch line, when cooling down the motor and the electric device using the coolant.

10. The battery cooling system for the vehicle of claim 7, wherein the second valve opens the second branch line, and closes connection of the cooling line with the battery cooling line, when the coolant heat-exchanged with the refrigerant cools the battery module or warms-up the battery module and increases a temperature of the battery module.

11. The battery cooling system for the vehicle of claim 1, wherein the first valve and the second valve are 3-way valves.

12. The battery cooling system for the vehicle of claim 1, wherein the degassing line exhausts bubbles generated from the coolant passed through the first branch line to the reservoir tank or introduces bubbles collected from the coolant circulated through the cooling line to the first branch line to maintain pressure balancing of the cooling line and the battery cooling line, when increases a temperature of the battery module.

13. The battery cooling system for the vehicle of claim 1, wherein the degassing line partially introduces the bubbles included in the coolant passed through the first branch line to the reservoir tank to prevent pressure difference generation between the cooling line and the first branch line, when the coolant heat-exchanged with the refrigerant cools the battery module in a state that the coolant is not circulated to the cooling line.

14. The battery cooling system for the vehicle of claim 1, wherein the motor and the electric device are serially disposed on the cooling line between the radiator and the first water pump.

15. The battery cooling system for the vehicle of claim 1, wherein the electric device includes:
- an electric power control unit (EPCU) provided on the cooling line between the motor and the first water pump; and
- an on-board charger (OBC) provided on the cooling line between the motor and the radiator.

16. The battery cooling system for the vehicle of claim 1, wherein
- a heater is mounted between the battery module and the chiller in the battery cooling line, and
- the heater is configured to be operated when increasing a temperature of the battery module to heat cooling water circulating through the battery cooling line and to introduce the heated cooling water into the battery module.

* * * * *